United States Patent
Simony

(10) Patent No.: US 7,391,449 B2
(45) Date of Patent: Jun. 24, 2008

(54) METHOD OF PROCESSING THE BLACK LEVEL OF A PIXEL MATRIX OF AN IMAGE SENSOR, AND CORRESPONDING SENSOR

(75) Inventor: Laurent Simony, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 819 days.

(21) Appl. No.: 10/870,336

(22) Filed: Jun. 17, 2004

(65) Prior Publication Data
US 2005/0024502 A1 Feb. 3, 2005

(30) Foreign Application Priority Data
Jun. 23, 2003 (FR) .................................. 03 07558

(51) Int. Cl.
*H04N 9/64* (2006.01)

(52) U.S. Cl. .................. 348/243; 348/245; 348/241

(58) Field of Classification Search ................. 348/245, 348/243, 257
See application file for complete search history.

(56) References Cited

U.S. PATENT DOCUMENTS

| | | | |
|---|---|---|---|
| 4,771,267 A | | 9/1988 | Russell |
| 4,974,072 A | * | 11/1990 | Hasegawa .................. 358/514 |
| 5,038,225 A | * | 8/1991 | Maeshima .................. 358/461 |
| 5,068,737 A | | 11/1991 | Taniguchi |
| 5,189,528 A | * | 2/1993 | Takashima et al. .......... 358/461 |
| 6,084,634 A | * | 7/2000 | Inagaki et al. ............... 348/294 |
| 6,320,186 B1 | | 11/2001 | Young |
| 6,499,663 B1 | | 12/2002 | Yahagi |
| 6,700,609 B1 | * | 3/2004 | Abe ........................... 348/241 |
| 6,774,941 B1 | * | 8/2004 | Boisvert et al. ............. 348/241 |
| 6,791,607 B1 | * | 9/2004 | Bilhan et al. ................ 348/243 |
| 2004/0090547 A1 | * | 5/2004 | Takeda ....................... 348/241 |

FOREIGN PATENT DOCUMENTS

| | | |
|---|---|---|
| EP | 0 579 838 | 1/1994 |
| FR | 2 534 435 | 4/1984 |
| FR | 2 686 472 | 7/1993 |

OTHER PUBLICATIONS

French Search Report, FR 03 07558, dated Dec. 19, 2003.

* cited by examiner

*Primary Examiner*—David Ometz
*Assistant Examiner*—Wanda M Negron
(74) *Attorney, Agent, or Firm*—Gardere Wynne Sewell LLP

(57) ABSTRACT

For each current image output from a pixel matrix, the digital words relative to at least one masked line of the matrix are processed to generate a current correction digital code. From this code, a black level compensation signal is generated and applied as an offset control on pixel signal amplification. If the current correct digital code does not differ from the code calculated for a previous image output by a predetermined amount, then the code for the previous image is instead used to generate the black level compensation signal.

20 Claims, 4 Drawing Sheets

METHOD OF PROCESSING THE BLACK LEVEL OF A PIXEL MATRIX OF AN IMAGE SENSOR, AND CORRESPONDING SENSOR

PRIORITY CLAIM

The present application claims priority from French Application for Patent No. 03 07558 filed Jun. 23, 2003, the disclosure of which is hereby incorporated by reference.

BACKGROUND OF THE INVENTION

1. Technical Field of the Invention

The present invention relates to the processing of the signals delivered by a pixel matrix of an image sensor, and more particularly the processing of the black level.

2. Description of Related Art

An image sensor in conventional manner comprises a pixel matrix. Each pixel delivers an electric signal, the level of which depends on the quantity of light received by the pixel. This signal is conventionally stored in a pair of sampling capacitors and then is amplified in a read amplifier.

An analog/digital converter makes an analog/digital conversion of each information element read and, for each image, digital words corresponding to the pixels of each line of the pixel matrix are delivered sequentially.

The black level (which is a pseudosignal due to the stray currents in the photodiodes of the pixels) is extremely variable depending on the technology, the temperature and the amplification gain used.

There is a need in the art to abstract from this black level, after evaluating it, the unprocessed signal of the sensor in order to isolate the true information from the sensor.

Another need in the art is to match the black level with a deterministic code at the output of the analog/digital converter in order also to allow optimized use of the analog/digital converter by avoiding digitizing this portion of offset containing no information.

SUMMARY OF THE INVENTION

In accordance with an embodiment of the invention, a method is proposed for processing information delivered by a pixel matrix of an image sensor. For each current image, an amplified read is made of the information delivered by each pixel. Each information element read is then analog/digital converted. A sequential delivery is made of the digital words corresponding to the pixels of each line of the pixel matrix.

Black level compensation processing is made. This processing includes, for each current image, the making of a sequential delivery of the digital words relating to at least one masked line of the matrix. A current correction digital code is then generated based on the digital words relative to at least one masked line, the preceding correction digital code, and a reference digital word. The current correction digital code is then applied to a digital/analog converter in order to obtain a black level compensation component taken into account at the amplified read and applicable throughout the read of the current image.

According to an aspect of the invention, the generating of the current correction code comprises determining a difference between the determined current code and the preceding code. If the absolute value of that difference is less than a predetermined and advantageously programmable tolerance, the current code equals the preceding code.

Operation in accordance with the present invention improves the visual quality of the image. In effect, if the corrections computed for consecutive images vary only by a few units, possibly caused by noise, a parasitic effect, etc., and if such an erratic correction is applied to the whole image, a fluctuation is perceived in the image, which can be inconvenient in certain applications. By not applying a current correction to the current image that may be very little different from the correction applied to the preceding image, this inconvenience can be overcome.

According to another embodiment of the invention, generating comprises determining an average of the digital words relative to at least one masked line of the matrix. A digital correction word corresponding to the difference between the average thus determined and the said reference digital word is then determined. The current correction code is then determined based on the preceding code and the difference.

The average, or more generally the value to be retained, can be determined in different ways. Thus the minimum of all of the data of the masked line could be chosen.

This being so, according to a non-limiting exemplary embodiment, the determination of the said average comprises:

selecting of groups of words from the delivered words relative to at least one masked line of the matrix;
determining the average of the words of each group of words; and
selecting the smallest of the averages thus determined.

An embodiment of the invention also proposes an image sensor. The sensor includes a pixel matrix and means of processing the information delivered by the pixel matrix. This means comprises at least one read amplifier and means of analog/digital conversion connected at the output of the amplifier in order to deliver sequentially for each image digital words corresponding to the pixels of each line of the pixel matrix. The processing means further includes means for compensating for the black level suitable for delivering sequentially digital words relative to at least one masked line of the matrix. This compensating means includes generation means suitable for generating a current correction digital code based on the said digital words relative to at least one masked line, the preceding correction digital code and a reference digital word. The compensating means also comprises an analog/digital converter receiving the current correction code and delivering a black level compensation component taken into account at the read amplifier and applicable throughout the read of the current image.

According to an embodiment, the current correction code generation means comprises means suitable for making the difference between the determined current code and the preceding code, and, if the absolute value of this difference is less than a programmable tolerance, the current code is equal to the preceding code.

According to an embodiment of the invention, the generation means comprises first computing means suitable for determining an average of the said digital words relative to at least one masked line of the matrix, second computing means suitable for determining a correction digital word corresponding to the difference between the average thus determined and the said reference digital word, and third computing means suitable for determining the said current correction code based on the preceding code and the said difference.

According to an embodiment of the invention, the first computing means comprises:

first selection means suitable for making a selection of groups of words from the words delivered relative to at least one masked line of the matrix;
means suitable for determining the average of the words of each group of words; and second selection means suitable for making the selection of the smallest of the averages thus determined.

The invention also proposes an image acquisition device, for example a video camera, comprising at least one image sensor as defined above.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
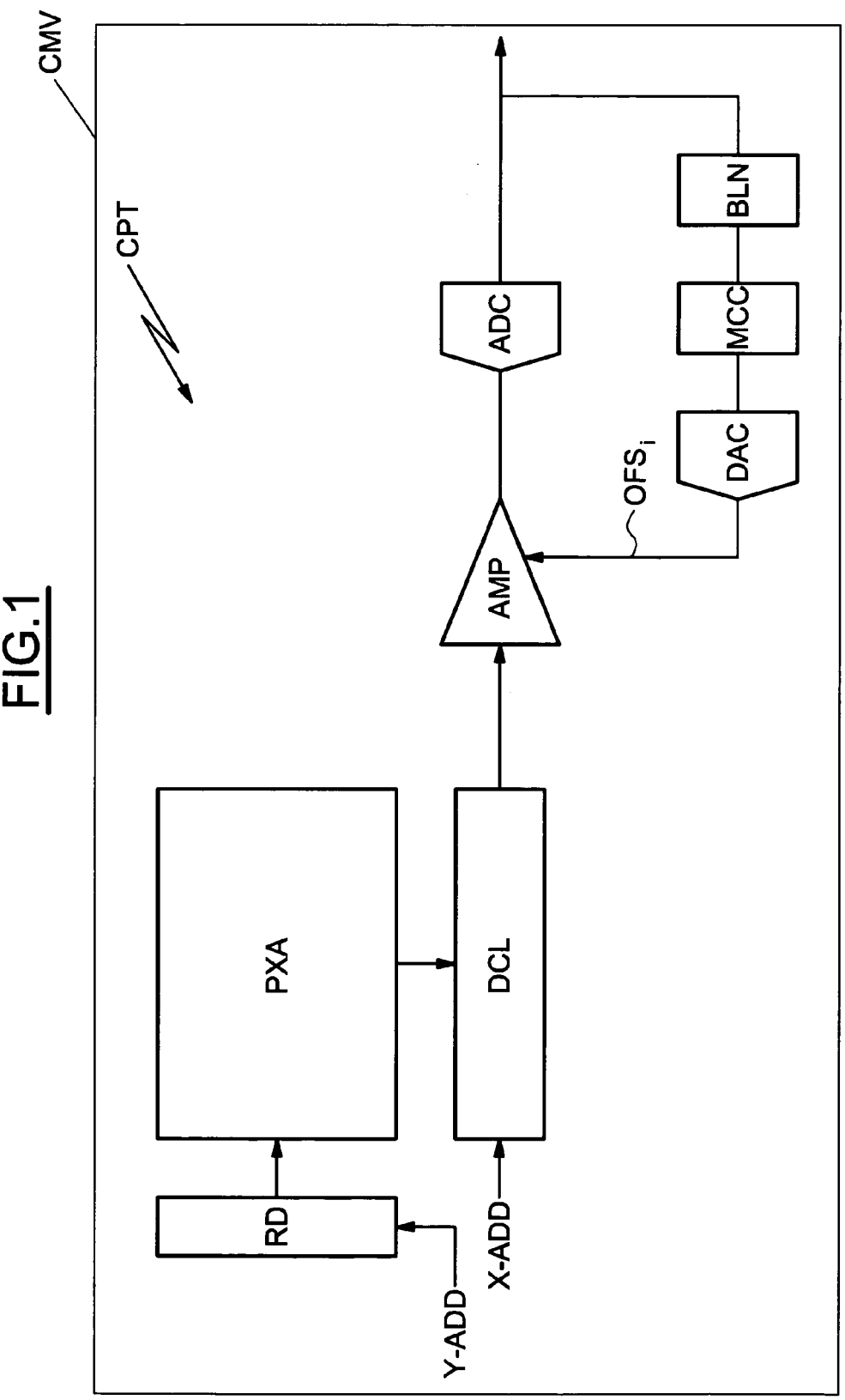
FIG. 1 is a schematic block diagram of an embodiment of an image sensor according to the invention.

In FIG. 1, the reference CPT designates an image sensor incorporated for example into a video camera CMV.

The image sensor CPT comprises a pixel matrix PXA organized in lines and columns.

The matrix may be fitted with color filters on the pixels or it may be monochrome.

A line decoder RD is used to select the lines of the matrix while, in the embodiment described here, a column decoder DCL is used to select the columns of the matrix.

Furthermore, in conventional manner known per se, a pair of sampling capacitors is connected to each column of the matrix via sampling transistors.

The method according to embodiments of the invention is independent of the method of sampling the signal delivered by each pixel and is in particular compatible with the method described in French Patent Application No. 0305363 in the name of the Applicant (the disclosure of which is incorporated by reference), which reduces the sampling noise.

Structure reading means that are conventional and known per se are used to read the charges stored in the sampling capacitors. Such reading means may have an architecture enabling a voltage read of the pixel signal or an architecture allowing a physical transfer of the charges contained in the sampling capacitors into two feedback capacitors connected between the inputs and outputs of a differential read amplifier. Such an architecture is for example described in French Patent Application No. 0300360 in the name of the Applicant (the disclosure of which is incorporated by reference).

The reading means also comprise conventionally an amplification means AMP followed by an analog/digital conversion means.

The analog/digital converter ADC delivers at the output and sequentially, for each line of an image, the digital words corresponding to the pixel information.

Furthermore, a digital block BLN, followed by computing means MCC for determining a digital code for a digital/analog converter DAC, are used, as will be seen in greater detail below, to perform for each current image of index i a black level compensation (offset voltage $OFS_i$) at the amplifier AMP.

This means that the best use can be made of the input range of the analog/digital converter ADC while converting only the payload portion of the signal and not the black offset portion.

To determine the black level, provision is made to use at least one masked line of the matrix PXA, that is to say a line in which the pixels are covered by a mask formed by a metallic layer. The purpose of this layer is to prevent the pixel in question from being lit so that the dark signal information can be read.

Figure 2:
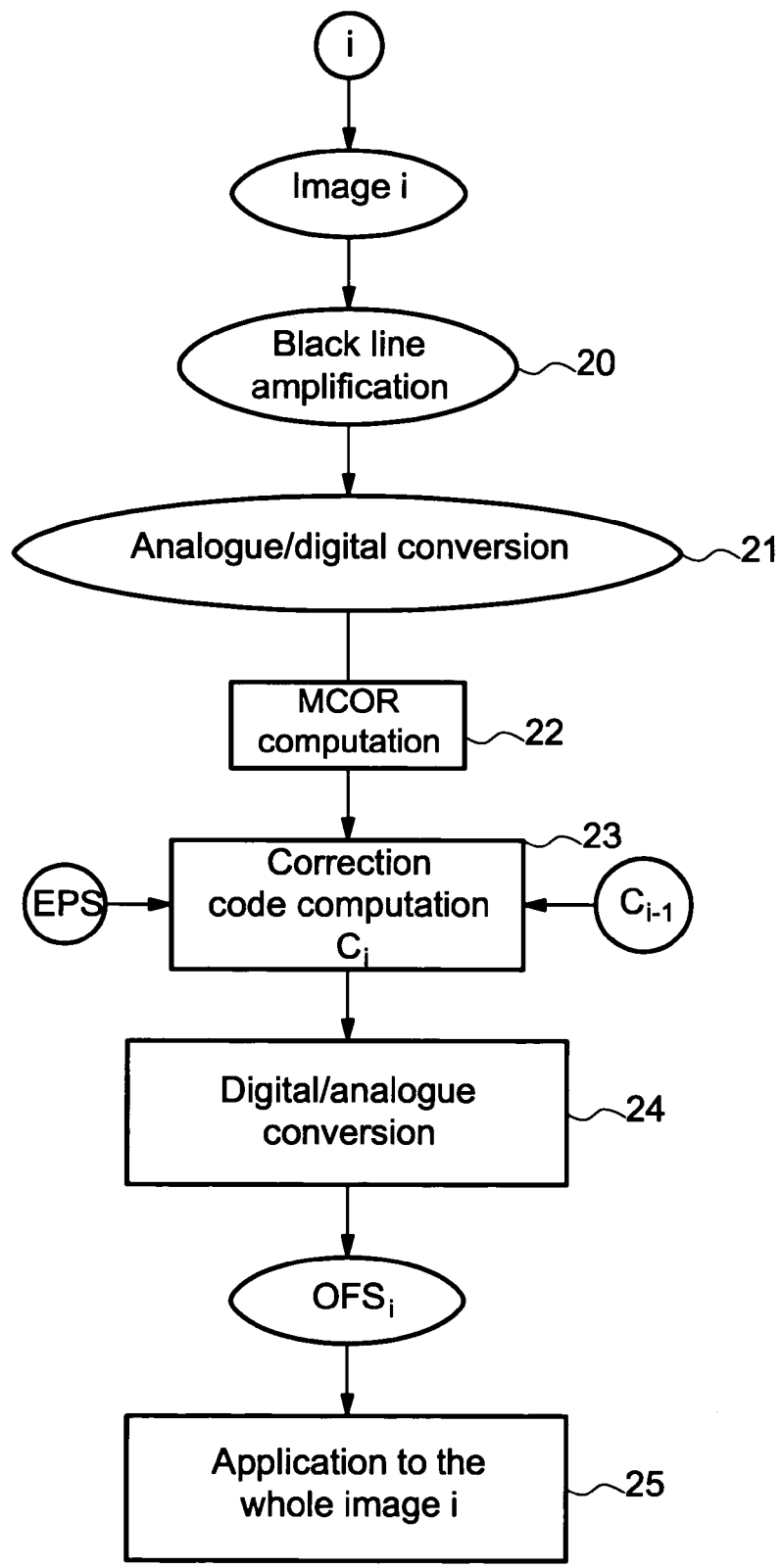
FIGS. 2-4 illustrate schematically a compensation of the black level according to the invention.

As illustrated in FIG. 2, after applying a possible change of gain of the amplifier AMP, reading of the current image of index i begins with the amplified read 20 of the masked line or lines.

After conversion 21 in the analog/digital converter ADC, digital words relative to this masked line of the matrix will be delivered sequentially.

The digital block BLN will carry out a certain number of processes 22 on these digital words and deliver a digital correction word MCOR. The digital block comprises appropriately designed digital logic and/or signal processing circuitry suited to implement the processes and compute the digital correction word.

This correction word MCOR will subsequently be used to compute (step 23) a current code $C_i$, called the current correction code, which will be delivered to the input of the digital/analog converter DAC in order to obtain at the output the offset analog correction $OFS_i$, which will be applied (step 25) throughout the read of the image i, as for the gain adjustments.

As will be seen in greater detail below in an example, the determination of the current correction code takes account in particular of the correction code $C_{i-1}$ previously computed for the preceding image.

Furthermore, provision is made for a decision to be taken to determine whether the current correction code that has just been computed should or should not effectively be applied to the input of the converter ADC.

More precisely, if the absolute value of the difference between the current code and the preceding code is less than an advantageously programmable tolerance EPS equal for example to a few units, the preceding code will be applied as the current code.

This will avoid a visible fluctuation on the current image.

Figure 3:
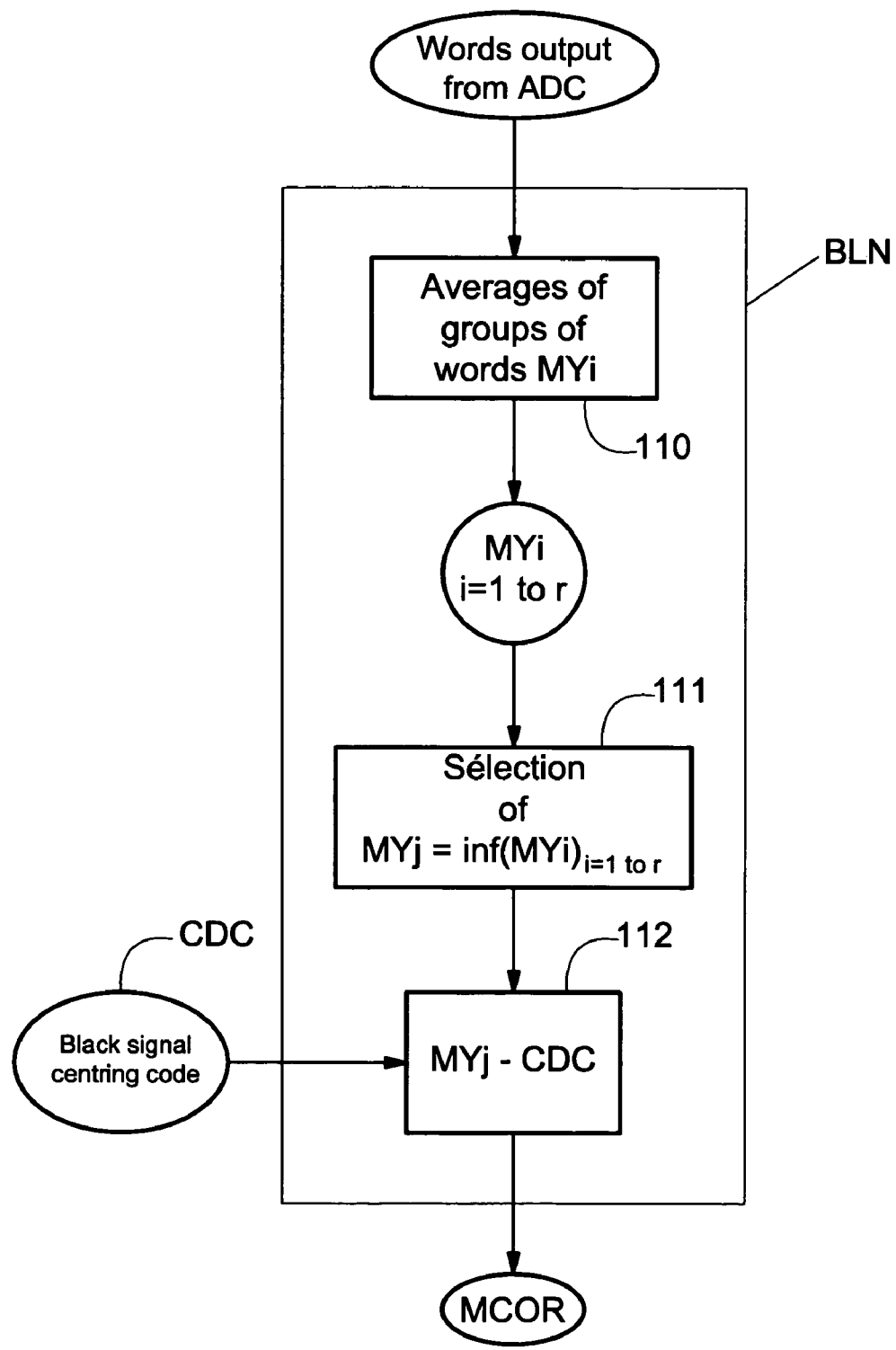
Figure 4:
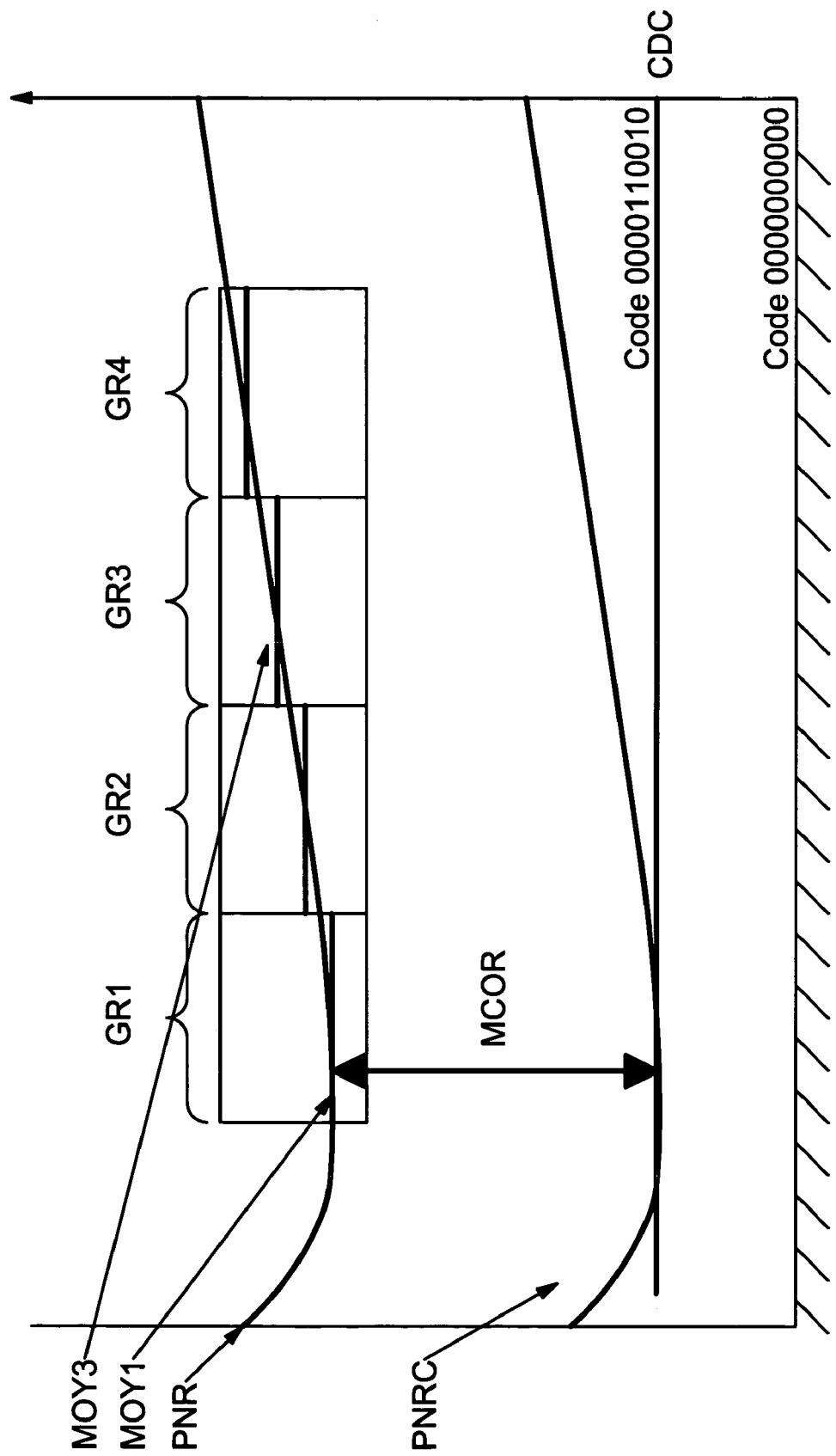

Reference will now be made to FIGS. 3 and 4 to describe in greater detail the function of the means incorporated into the digital block BLN and produced for example by software, as well as an example of computing the current correction code $C_i$.

In FIG. 4, the reference PNR indicates the curve representing the black signal prior to correction.

First means of selection will select groups of words, here four groups of words GR1-GR4, from the words output from the analog/digital converter ADC and relative to the masked line (step 110, FIG. 3). This means can be implemented using conventional digital logic or processing circuitry as understood by one skilled in the art.

As an example, each group of words may comprise 64 words corresponding to 64 pixels.

Then, first computing means will determine the average of the words of each group of words (step 110, FIG. 3). This first computing means can be implemented using conventional digital logic or processing circuitry as understood by one skilled in the art.

Second means of selection will select the smallest MOYj of the averages MOYi thus determined (step 111, FIG. 3). This means can be implemented using conventional digital logic or processing circuitry as understood by one skilled in the art.

Then, second computing means determine the digital correction word MCOR (step 112, FIG. 3), corresponding to the difference between the average MOYj thus selected and a reference digital word CDC that is in fact here a black signal centering code. This second computing means can be implemented using conventional digital logic or processing circuitry as understood by one skilled in the art.

In the example described here and illustrated in FIG. 4, this centering code is for example the analog/digital converter code equal to 50 in decimal notation.

Furthermore, the value MOYj equals $(AVn-OFS_{i-1})/LSBadc$ where A is the gain of the amplifier AMP, Vn is the black signal delivered by the masked line present at the amplifier AMP input, and LSBadc is the quantum of the converter ADC ($LSBadc=PE/2^b$ where PB is the full scale and b the number of bits of the digital words delivered by the converter ADC).

Also, $OFS_{i-1}$ equals $K\,C_{i-1}$, where K is a coefficient characteristic of the converter DAC that depends on the law of correspondence between the quantum of the converter DAC and that of the converter ADC. As an example, a correspondence of 1/1 may be adopted. In other terms, $K*LSBdac=LSBadc$ is adopted where $K=1$.

Similarly, the value CDC equals $(AVn-OFS_i)/LSBadc$.

The result therefore is that the current correction code $C_i$ equals $C_{i-1}-LSBadc(CDC-MOYj)/K$, that is to say $C_{i-1}-LSBadc(MCOR)/K$.

Appropriate digital logic or processing circuitry can be designed by one skilled in the art to implement the foregoing arithmetical signal processing operations.

It should be noted that in video mode, and this is an advantage of the invention, it is not necessary to know precisely the law of correspondence between the quantum of the converter DAC and that of the converter ADC, because the method according to the invention uses an iterative process. In effect, the first correction on the first image is a rough correction, and by the time of the second iteration (second image) the correction becomes extremely precise.

In FIG. 4, the reference PNRC represents the profile of the black signal after correction.

Injecting the analog correction OFS before digitization allows better usage of the analog/digital converter ADC.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for processing pixel signals output from a pixel matrix of an image sensor, the pixel signal including a black level component, the pixel matrix including both imaging pixels and mask pixels, comprising:
   amplifying the pixel signals;
   extracting information for the amplified pixel signals corresponding to the mask pixels; and
   calculating from the extracted mask pixel information a black level compensation signal, comprising calculating a difference between the extracted mask pixel information for a current image in a sequence of images and the extracted mask pixel information for a preceding image in the sequence of images, wherein the black level compensation signal is a current image black level compensation signal calculated from the extracted mask pixel information of the current image in the sequence if the calculated difference exceeds a threshold, and wherein the black level compensation signal is a preceding image black level compensation signal calculated from the extracted mask pixel information of the preceding image in the sequence if the calculated difference does not exceed the threshold;
   wherein amplifying includes taking the black level compensation signal into account throughout the processing of the current image in the sequence when amplifying the pixel signals.

2. The method of claim 1 wherein taking the black level compensation signal into account comprises applying the black level compensation signal as an offset in the amplification of the pixel signals.

3. The method of claim 1 further including:
   analog-to-digital converting of the amplified pixel signals to generate digital words;
   wherein extracting comprises extracting the digital words for the amplified pixel signals corresponding to the mask pixels; and
   wherein calculating a difference comprises calculating a correction code based on the extracted digital words.

4. The method of claim 3 wherein calculating the correction code is made for each one of a plurality of sequential images and further including selecting a current correction code for a current one of the images to provide the black level compensation signal if the current correction code for the current image differs from the prior correction code for the preceding image by more than the threshold which comprises a predetermined tolerance.

5. The method of claim 3 wherein calculating the correction code is made for each one of a plurality of sequential images and further including selecting a prior correction code for a prior one of the images to provide the black level compensation signal if the current correction code for the current image does not differ from the prior correction code for the preceding image by more than the threshold which comprises a predetermined tolerance.

6. The method of claim 3 further comprising digital-to-analog converting the correction code to generate the black level compensation signal.

7. An image sensor, comprising:
   a pixel matrix including both imaging pixels and mask pixels and outputting pixel signals, the pixel signals including a black level component;
   an amplifier with an offset control input that amplifies the pixel signals; and
   a processing circuit that calculates from information for the amplified pixel signals corresponding to the mask pixels a black level compensation signal by calculating a difference between the mask pixel information for a current image in a sequence of images and the mask pixel information for a preceding image in the sequence of images, wherein the black level compensation signal is a current image black level compensation signal calculated from the mask pixel information of the current image in the sequence if the calculated difference exceeds a threshold, and wherein the black level compensation signal is a preceding image black level compensation signal calculated from the mask pixel information of the preceding image in the sequence if the calculated difference does not exceed the threshold;
   wherein the black level compensation signal is applied to the offset control input of the amplifier and taken into account throughout the processing of the current image in the sequence when amplifying the pixel signals.

8. The image sensor of claim 7 further including:
   an analog-to-digital converter that converts the amplified pixel signals to generate digital words;
   wherein the processing circuit calculates a correction code based on the digital words for the amplified pixel signals corresponding to the mask pixels.

9. The image sensor of claim 8 wherein the processing circuit calculates the correction code for each one of a plurality of sequential images and further selects a current correction code for a current one of the images to provide the black level compensation signal if the current correction code for the current image differs from the prior correction code for the preceding image by more than the threshold which comprises a predetermined tolerance.

10. The image sensor of claim 8 wherein the processing circuit calculates the correction code for each one of a plurality of sequential images and further selects a prior correction code for a prior one of the images to provide the black level compensation signal if the current correction code for the current image does not differ from the prior correction code for the preceding image by more than the threshold which comprises a predetermined tolerance.

11. The image sensor of claim 8 further comprising a digital-to-analog converter to convert the correction code into the black level compensation signal.

12. A method of processing information delivered by a pixel matrix of an image sensor, comprising:
receiving for each image an amplified read of the information delivered by each pixel;
analog/digital converting of each information read to sequentially deliver digital words corresponding to the pixels of each line of the pixel matrix; and
processing for black level compensation as to each individual image in a sequence of images, comprising:
sequentially delivering digital words relating to at least one masked line of the matrix for the image;
generating an image correction digital code based on the digital words relative to at least one masked line for the image;
determining a difference between the image correction digital code generated for a current image and the image correction digital code generated for an immediately preceding image in the sequence;
setting a current image correction digital code to be the image correction digital code for the current image if the determined difference exceeds a threshold or setting the current image correction digital code to be the image correction digital code for the immediately preceding image if the determined difference is less than the threshold;
converting the set current image correction digital code to obtain a black level compensation component; and
applying the black level compensation component to the pixel information of the current image throughout the amplified read of the current image.

13. The method according to claim 1, wherein determining a difference comprises determining an absolute value of the determined difference for comparison to the threshold which comprises a programmable tolerance.

14. The method according to claim 1, wherein generating the image correction digital code comprises determining an average of the digital words relative to at least one masked line of the matrix, determining a digital correction word corresponding to the difference between the average thus determined and a reference digital word, and determining the image correction digital code based on the image correction digital code for the preceding image and the digital correction word.

15. The method according to claim 14, wherein the determining of the average comprises:
selecting of groups of words from the delivered words relative to at least one masked line of the matrix,
determining the average of the words of each group of words, and
selecting the smallest of the averages thus determined.

16. An image sensor, comprising:
a pixel matrix; and
means for processing the information delivered by the pixel matrix, said means comprising:
at least one read amplifier and an analog/digital converter connected to the output of the amplifier to sequentially deliver, for each image in a sequence of images, a digital word corresponding to the pixels of each line of the pixel matrix;
means for processing digital words relative to at least one masked line of the matrix to generate an image correction digital code based on the digital words relative to at least one masked line for the image, for determining a difference between the image correction digital code generated for a current image and the image correction digital code generated for an immediately preceding image in the sequence, and for setting a current image correction digital code to be the image correction digital code for the current image if the determined difference exceeds a threshold or setting the current image correction digital code to be the image correction digital code for the immediately preceding image if the determined difference is less than the threshold;
a digital/analog converter receiving the current image correction code and delivering a black level compensation component that is taken into account at the read amplifier and applicable throughout the read of the current image in the sequence.

17. The image sensor according to claim 16, wherein the means for determining a difference comprises determining an absolute value of the determined difference for comparison to the threshold which comprises a programmable tolerance.

18. The image sensor according to claim 16, wherein the means for processing comprises first computing means suitable for determining an average of the digital words relative to at least one masked line of the matrix, second computing means suitable for determining a correction digital word corresponding to the difference between the average thus determined and a reference digital word, and third computing means suitable for determining the image correction digital code based on the image correction digital code form the preceding image and the correction digital word.

19. The image sensor according to claim 18, wherein the first computing means comprises:
first selection means suitable for making a selection of groups of words from the words delivered relative to at least one masked line of the matrix,
means suitable for determining an average of the words of each group of words, and
second selection means suitable for making the selection of a smallest of the averages thus determined.

20. The image sensor of claim 16 as used within a video camera.

* * * * *